United States Patent [19]
Taylor et al.

[11] Patent Number: 5,681,373
[45] Date of Patent: Oct. 28, 1997

[54] PLANAR SOLID-STATE MEMBRANE MODULE

[75] Inventors: Dale M. Taylor; Jeffrey Donald Bright, both of Salt Lake City, Utah; Michael Francis Carolan, Allentown, Pa.; Raymond Ashton Cutler, Bountiful, Utah; Paul Nigel Dyer, Allentown; Eric Minford, Laurys Station, both of Pa.; David W. Prouse, Salt Lake City, Utah; Robin Edward Richards, Lansdale; Steven L. Russek, Allentown, both of Pa.; Merrill Anderson Wilson, West Jordan, Utah

[73] Assignee: Air Products and Chemicals, Inc., Allentown, Pa.

[21] Appl. No.: 402,689

[22] Filed: Mar. 13, 1995

[51] Int. Cl.$^6$ ............................ B01D 53/22; B01D 71/02
[52] U.S. Cl. ............................................ 96/11; 96/7
[58] Field of Search ............................ 95/54; 94/4, 11, 94/7; 55/523, 524

[56] References Cited

U.S. PATENT DOCUMENTS

| | | | |
|---|---|---|---|
| 2,824,620 | 2/1958 | deRosset | 96/11 X |
| 3,238,704 | 3/1966 | Straschil et al. | 96/11 |
| 4,490,445 | 12/1984 | Hsu | 429/32 |
| 4,877,506 | 10/1989 | Fee et al. | 204/242 |
| 4,894,160 | 1/1990 | Abe et al. | 55/523 X |
| 4,902,420 | 2/1990 | Pall et al. | 55/523 X |
| 5,034,023 | 7/1991 | Thompson | 55/2 |
| 5,108,465 | 4/1992 | Bauer et al. | 95/54 |
| 5,126,045 | 6/1992 | Kohlheb et al. | 96/4 X |
| 5,160,713 | 11/1992 | Mazanec et al. | 95/54 X |
| 5,228,891 | 7/1993 | Adiletta | 55/523 X |
| 5,240,473 | 8/1993 | Carolan et al. | 95/54 |
| 5,240,480 | 8/1993 | Thorogood et al. | 96/4 |
| 5,261,932 | 11/1993 | Carolan et al. | 95/54 |
| 5,269,822 | 12/1993 | Carolan et al. | 95/54 |
| 5,298,341 | 3/1994 | Khandkar et al. | 96/4 X |
| 5,332,597 | 7/1994 | Carolan et al. | 427/243 |
| 5,342,431 | 8/1994 | Anderson et al. | 96/4 X |
| 5,356,728 | 10/1994 | Balachandran et al. | 429/8 |
| 5,447,555 | 9/1995 | Yee et al. | 95/54 |

FOREIGN PATENT DOCUMENTS

| | | | |
|---|---|---|---|
| 61-278328 | 12/1986 | Japan | 96/11 |
| 3-065212 | 3/1991 | Japan | 96/4 |
| 3-265504 | 11/1991 | Japan | 96/4 |
| 4-156916 | 5/1992 | Japan | 96/4 |

*Primary Examiner*—Robert Spitzer
*Attorney, Agent, or Firm*—Keith D. Gourley

[57] ABSTRACT

Planar solid-state membrane modules for separating oxygen from an oxygen-containing gaseous mixture which provide improved pneumatic and structural integrity and ease of manifolding. The modules are formed from a plurality of planar membrane units, each membrane unit which comprises a channel-free porous support having connected through porosity which is in contact with a contiguous dense mixed conducting oxide layer having no connected through porosity. The dense mixed conducting oxide layer is placed in flow communication with the oxygen-containing gaseous mixture to be separated and the channel-free porous support of each membrane unit is placed in flow communication with one or more manifolds or conduits for discharging oxygen which has been separated from the oxygen-containing gaseous mixture by permeation through the dense mixed conducting oxide layer of each membrane unit and passage into the manifolds or conduits via the channel-free porous support of each membrane unit.

17 Claims, 7 Drawing Sheets

PLANAR SOLID-STATE MEMBRANE MODULE

FIELD OF THE INVENTION

This invention relates to planar solid-state membrane modules formed from a plurality of membrane units which are capable of separating oxygen from an oxygen-containing gaseous mixture. The modules which provide improved pneumatic integrity are fabricated from a plurality of planar solid-state membrane units comprising mixed conducting metallic oxides which exhibit electron conductivity and oxygen ion conductivity at elevated temperatures.

BACKGROUND OF THE INVENTION

Solid state membranes formed from oxygen ion-conducting materials continue to show promise in a variety of commercial processes including the separating of oxygen from oxygen-containing gaseous mixtures. Representative solid-state membranes are those formed from multicomponent metallic oxides which are typically operated at high temperatures (e.g. 700° C. or more) wherein the solid-state membranes conduct both oxygen ions and electrons. When a difference in oxygen partial pressure exists on opposite sides of the mixed conducting metallic oxide membrane and operating conditions are properly controlled, oxygen is separated from the oxygen-containing gaseous mixture as oxygen ions migrate to the low oxygen partial pressure side of the solid-state membrane while an electron flux occurs in the opposite direction of oxygen ion migration in order to conserve charge, producing pure oxygen on the permeate side of the membrane.

A plurality of solid state membrane units may be joined together to form a membrane module wherein channels are incorporated into each respective membrane unit in order to facilitate introducing the oxygen-containing gaseous mixture to be separated into the module and recovering the oxygen product from the module. As shall be further described in this Specification, Applicants have discovered that the dense mixed conducting oxide layer spanning the supporting channels is susceptible to mechanical failure when a pressure differential is applied across the planar solid-state membrane units of the planar solid-state membrane module. Moreover, the channeled layers of the membrane units making up the module are somewhat difficult to fabricate.

Gas separation modules and fuel cells of the prior art are typically operated under conditions such that a near zero pressure differential exists across the membrane cells wherein problems associated with pneumatic integrity are minimized and minor leaks are tolerated to a limited extent between the cells. Moreover, the effective active surface area of the dense mixed conducting oxide separating layer of the individual membranes is restricted by the channeled layers which typically support the dense mixed conducting separating layer of the membranes. These modules must be manifolded in a configuration such that oxygen can exit through the channels within each membrane unit.

A solid electrolyte oxygen pump formed from a plurality of solid-state membranes is presented in U.S. Pat. No. 4,877,506. The oxygen pump possesses electrodes which are shaped to form a plurality of linear, parallel channels on facing surfaces of the electrolyte. The air feed is introduced into the channels formed of the air electrode. Oxygen formed during operation of the device is removed by passage through the electrolyte via channels formed of the oxygen electrode or anode. A monolithic array is formed by situating an interconnecting material between adjacent cells to form a stack of cells.

Fuel cell modules formed from a plurality of cells are well known in the art. Representative fuel cells are disclosed in U.S. Pat. No. 4,490,445 which teaches a solid oxide electrochemical energy converter comprising alternating layers of solid oxide electrolyte plates and electrical conductor plates. Each electrolyte plate includes a coating of a porous oxidizer electrode on a first surface of the electrolyte and a coating of a porous fuel electrode on a second surface of the electrolyte. Each conductor plate includes grooved networks formed by ridges which define gas passages on both surfaces of the conductor plate, such ridges being in electrical contact with the electrode coatings on next adjacent electrolytes. Each conductor plate also possesses a means for tapping electricity from or introducing electricity into the converter. The conductor plates also possess circumferential ridges arranged along the edges of the conductor plate to define gas seals, the ridges being in contact with surface coatings on next adjacent electrolyte plates which surface coatings possess the same composition as that of the electrode coatings.

U.S. Pat. No. 5,034,023 discloses ceramic honeycomb structures which are capable of separating oxygen from an oxygen-containing gaseous mixture. The channeled honeycombs are formed from a solid electrolyte having at least some of the honeycomb channels sealed at one of its faces. The oxygen-containing gas is introduced into a first set of channels at one face of the honeycomb, a first voltage is applied to the interior walls of the channels and a second voltage is applied to the interior walls of the second set of remaining channels thereby creating an electrical potential across the ceramic material separating adjacent channels of the two sets. The electrical potential drives oxygen ions through the channel walls releasing molecular oxygen into the second set of channels which can be collected.

U.S. Pat. No. 5,240,480 discloses solid-state membranes for separating oxygen from oxygen-containing gaseous mixtures. These membranes comprise a multicomponent metallic oxide porous layer having an average pore radius of less than about 10 micrometers and a multicomponent metallic oxide dense layer having no connected through porosity wherein the porous layers and dense layers are contiguous and such layers conduct electrons and oxygen ions at operating temperatures.

U.S. Pat. No. 5,356,728 and European Patent Application WO 94/24065 disclose cross-flow electrochemical reactor cells formed from multicomponent metallic oxides of the perovskite structure which demonstrate electron conductivity and oxygen ion conductivity at elevated temperatures. Such cells are useful in carrying out partial oxidation reactions of organic compounds to form added-value products and separating oxygen from oxygen-containing gaseous mixtures.

The cross-flow reactor cells of U.S. Pat. No. 5,356,728 comprise either a hollow ceramic blade positioned across a gas stream flow containing one or more channels for flow of gas streams or a stack of crossed hollow ceramic blades containing one or more channels for flow of gas streams. Each channel has at least one channel wall disposed between a channel and a portion of an outer surface of the ceramic blade or a common wall with adjacent blades in a stack comprising a gas impervious multicomponent metallic oxide, typically of a perovskite structure, which exhibits electron conductivity and oxygen ion conductivity at elevated temperatures. Thus, the channels are contiguous to the outer surface of the ceramic blade which is formed from the multicomponent metallic oxide.

Industry is searching for solid-state membrane modules which are suitable for conducting a wide variety of processes and reactions wherein the modules would exhibit improved pneumatic and structural integrity. Moreover, such modules would desirably be readily fabricated and manifolded and would be capable of withstanding the pressure differential necessary in practicing air separation processes and desirable in practicing partial oxidation processes. Such modules would desirably not possess structural elements such as channels which are in contact with the dense mixed conducting oxide layer because such channels limit the effective active surface area of the dense mixed conducting oxide layer of each membrane unit. Such channels render the membrane units of prior art planar solid state membrane modules susceptible to mechanical failure when a pressure differential is applied across the membrane units of the module.

BRIEF SUMMARY OF THE INVENTION

The present invention relates to planar solid-state membrane modules which can be used to carry out a variety of processes including the separating of any ionizable component from a feedstream wherein such ionizable component is capable of being transported through the dense mixed conducting oxide layer of the membrane units making up the membrane modules. For example, the ionizable component may be oxygen present in air wherein oxygen ions are passed through the dense mixed conducting oxide layers of the planar membrane unit. Hydrogen can also be separated from a feed stream by fabricating the dense mixed conducting oxide layer of each membrane unit from a mixed conducting oxide which is capable of transporting the ionized hydrogen species.

The planar solid-state membrane modules of the present invention can also be used to carry out a variety of reactions such as oxidative coupling, chemical deoxygenation, oxidative dehydrogenation and the like. For example, the modules can be utilized to produce synthesis gas by oxidation of methane, natural gas or other light hydrocarbons, or to produce unsaturated compounds from saturated hydrocarbon compounds.

The membrane units making up each planar solid-state membrane module of the present invention possess a channel-free porous support having connected through porosity which is in contact with a contiguous planar dense mixed conducting oxide layer having no connected through porosity, and optional porous layers and channeled layers which are oriented such that kinetic limitations associated with oxygen transport are dramatically reduced, oxygen flux is substantially improved and the module demonstrates substantially improved pneumatic and structural integrity. While the dense mixed conducting oxide layer is dense, meaning that the layer does not possess a network of pores, minor fissures or holes may be tolerated to a limited extent provided separation selectivity is not reduced to unacceptable levels.

Applicants have discovered that substantially improved planar solid-state membrane modules can be fabricated when the channeled layer adjacent to the dense mixed conducting oxide layer of prior art membrane units is eliminated and replaced by a channel-free porous support having connected through porosity. The term, connected through porosity, means that the channel-free porous support has a matrix of pores throughout its three-dimensional structure which is capable of transferring process gases from one side of the porous support to the opposite side of the porous support.

The most general embodiment of the planar solid-state membrane modules of the present invention comprise a plurality of planar membrane units, each planar membrane unit which comprises a channel-free planar porous support having connected through porosity which is in contact with a contiguous planar dense mixed conducting oxide layer having no connected through porosity wherein the planar dense mixed conducting oxide layer is in flow communication with the oxygen-containing gaseous mixture to be separated and wherein the planar channel-free porous support of each membrane unit is in flow communication with a removal means for discharging oxygen which has been separated from the oxygen-containing gaseous mixture by permeation through the planar dense mixed conducting oxide layer of each membrane unit and passage into the removal means via the planar channel-free porous support of each membrane unit. Optionally, the planar solid state membrane units of the module of this embodiment may further comprise one or more channeled layers which are contiguous to the planar channel free porous support on a side opposite the dense mixed conducting oxide layer. The composition and structure of the channel layer shall be described in greater detail hereunder.

Suitable mixed conducting oxides for fabricating the dense mixed conducting oxide layer and the channel-free porous support of the membrane units are represented by the formula $A_x A'_{x'} A''_{x''} B_y B'_{y'} B''_{y''} O_{3-z}$, where A,A',A" are chosen from the group comprising Groups 1, 2 and 3 and the F block lanthanides; and B,B',B" are chosen from the D block transition metals according to the Periodic Table of the Elements adopted by the IUPAC wherein $0<x\leq1$, $0\leq x'\leq1$, $0\leq x''\leq1$, $0\leq y\leq1$, $0\leq y'\leq1$, $0\leq y''\leq1$, $1.1>x+x'+x''>0.9$, $1.1>y+y'+y''>0.9$ and z is a number which renders the composition charge neutral.

Preferably, A,A' or A" of the above-enumerated formula is a Group 2 metal selected from the group consisting of calcium, strontium, barium and magnesium. Preferred mixed conducting oxides are represented by the formula $La_x A'_{x'} Co_y Fe_{y'} Cu_{y''} O_{3-z}$ wherein $1.1>x+x'>0.9$, $1.1>y+y'+y''>0.9$ with the proviso that $0<y'\leq0.4$, and $0<y''\leq0.4$, and A' is selected from strontium, barium or calcium and magnesium. Again, z is a number which renders the composition charge neutral.

Alternately, suitable mixed conducting oxides for fabricating the dense mixed conducting oxide layer and the channel-free porous support of the planar membrane units can be formed from a mixture of one or more ionically-conducting compositions and one or more electron-conducting compositions to form a composite which possesses mixed conductivity, meaning that the composite conducts ions and electrons under operating conditions.

The channel-free porous support of each membrane unit may also be fabricated from an inert material in the sense that the material does not conduct oxygen ions and/or electrons at process operating conditions, an ionically conducting material, an electronically conducting material or a mixed conducting oxide material of the same or different composition with respect to the dense mixed conducting oxide layer of the membrane module. Preferably, the channel-free porous support is fabricated from a mixed conducting oxide material having thermal expansion properties which are compatible with the dense mixed conducting oxide layer and any additional layers of the membrane unit. The compositions making up the respective layers should be selected from materials which do not adversely chemically react with one another under process operating conditions.

Representative materials for fabricating the channel-free porous support which are not mixed conducting under process operating conditions, meaning that such materials do not conduct both oxygen ions and electrons at elevated temperatures, include alumina, ceria, silica, magnesia, titania, a high temperature oxygen compatible metal alloy, a metal oxide stabilized zirconia and compounds and mixtures thereof.

The thickness of the channel-free porous support, the porosity and the average pore diameter of the porous material making up the porous support of each membrane unit can be varied to ensure sufficient mechanical strength of the membrane unit. The planar channel-free porous support preferably possesses pores having a diameter of less than 5 times the thickness of the planar dense mixed conducting oxide layer. The planar dense mixed conducting oxide layer of each membrane unit typically has a thickness ranging from 0.01 micrometer to about 500 micrometers.

In an alternate embodiment of the invention, one or more membrane units of the planar solid-state membrane module further comprise a planar porous layer situated contiguous to the planar channel-free porous support on a side opposite the planar dense mixed conducting oxide layer. The membrane units can further comprise one or more additional planar porous layers which are situated contiguous to the first planar porous layer on the side opposite the planar channel-free porous support. The respective planar porous layers may be fabricated such the porous layers have successively larger average pore radii as a function of distance away from the dense mixed conducting oxide layer. The use of a plurality of planar porous layers has been found to improve mass transfer characteristics of the planar solid state membrane module.

The porous layers of the membrane units possess connected through porosity and may be fabricated from an inert material as previously described, meaning a material which does not conduct oxygen ions and electrons at operating temperatures, an ionically-conducting material, an electron-conducting material or a mixed conducting metallic oxide as described with respect to the channel-free porous support and the dense mixed conducting oxide layer.

The desired thickness of each porous layer is regulated by the following considerations. First, the porosity and average pore radius of each porous layer should be regulated such that oxygen flux is not impeded while maintaining sufficient mechanical strength. Second, the pores or pore network within each porous layer should be wide enough so that oxygen flux is not impeded, but not so wide as to cause sagging of the dense mixed conducting oxide layer during fabrication and operation. Third, each porous layer should be compatible with each adjacent layer in terms of chemical reactivity, adhesion and thermal expansion to reduce problems associated with cracking and delamination of the contiguous layers of each planar solid-state membrane unit.

In another alternate embodiment, the membrane units possessing one or more porous layers may further comprise a channeled layer which is situated contiguous to the one or more planar porous layers on a side opposite the planar channel-free porous support. Optionally, the membrane unit may possess additional channeled layers which are situated contiguous to the first channeled layer on a side opposite the one or more planar porous layers.

The channeled layers may be fabricated from materials which possess connected through porosity or dense materials which do not possess connected through porosity. The channeled layers may be fabricated from an inert material in the sense that the material does not conduct oxygen ions or electrons at process operating conditions, an ionically-conducting material, an electron-conducting material or a mixed conducting oxide material of the same or different composition with respect to the dense mixed conducting oxide layer or the channel-free porous support of the membrane module. As such, suitable materials are those previously described for fabricating the dense mixed conducting oxide layer and the channel-free porous support.

The channels within the channeled layers may be fabricated in a wide variety of shapes, in cross-section, such as rectangular, trapezoidal, semi-circular and the like. The depth and spacing of the channels may be widely varied and optimum designs may be assessed for a given application without undue experimentation. The channeled layer may be partially or totally replaced by means for minimizing gas phase diffusion resistance. A suitable means comprises a repeating network of isolated cylindrical, conical or rectangular pins designed to distribute gas flow while minimizing pressure drop during operation and to distribute and transfer mechanical load through the structure.

In another embodiment of the present invention, any of the membrane unit embodiments can be further modified by placing a catalyzed layer contiguous to the planar dense mixed conducting oxide layer on a side opposite the channel-free porous support or contiguous to the surface of the membrane unit which is placed in flow communication with a process stream. Catalysts to be deposited onto the enumerated surface of the dense mixed conducting oxide layer of the planar solid-state membrane modules of this invention include any material which catalyzes the dissociation of oxygen molecules to oxygen ions. Suitable catalysts include metals and oxides of metals selected from Groups II, V, VI, VII, VIII, IX, X, XI, XV and the F Block lanthanides of the Periodic Table of the Elements according to the International Union of Pure and Applied Chemistry. Suitable metals include platinum, palladium, ruthenium, gold, silver, bismuth, barium, vanadium, molybdenum, cerium, praseodymium, cobalt, rhodium and manganese.

The planar solid-state membrane modules of this invention can conveniently be used to separate oxygen from an oxygen-containing gaseous mixture or to partially oxidize an oxidizable compound wherein the planar dense mixed conducting oxide layer of each membrane unit is placed in flow communication with the oxygen-containing gaseous mixture to be separated or is placed in flow communication with a feedstock to be partially oxidized to produce synthesis gas or other partially oxidized products.

When an oxygen partial pressure difference is created on opposite sides of the dense mixed conducting oxide layer of each membrane unit, oxygen ions are transported through the dense mixed conducting oxide layer, the oxygen ions recombine into molecules on the opposite side of the dense mixed conducting oxide layer and the oxygen molecules are transported into the contiguous channel-free porous support which resides at a lower oxygen partial pressure. The porous support is in flow communication with a means for discharging oxygen from the channel-free porous support of each membrane unit and out of the module.

A wide variety of structures can be used as a removal means for discharging oxygen or other process gases from the planar solid-state membrane modules because the channel-free porous support of each membrane unit possesses a network of pores throughout its three dimensions such that the removal means for discharging oxygen or other process streams from each planar solid-state membrane unit can be situated at any point of contact with the channel-free porous support of each membrane unit.

For example a suitable removal means for discharging oxygen from the membrane module comprises one or more manifolds which are placed in flow communication with the channel-free porous support of each membrane unit in order to collect oxygen which permeates through the dense mixed conducting oxide layer and passes into the channel-free porous support and out into one or more manifolds for collection or use in other process streams. An alternate removal means comprises one or more conduits which traverse the respective membrane units of the planar solid-state membrane module at any position of the module provided that such conduits are in flow communication with the channel-free porous support of each membrane unit.

The term, traverse, means that a conduit is placed in flow communication with each membrane unit via a structure which is impervious to gases other than oxygen. The conduit does not necessarily pass through each planar membrane module unit, but merely connects each planar membrane unit. When the conduit does not pass through each respective membrane unit, each membrane unit possesses a void space from which oxygen which has been separated from each membrane unit can pass out of each successive membrane unit and be collected via the conduit.

The removal means for discharging oxygen from the membrane module can be fabricated from the same materials used to form the dense mixed conducting oxide layer as well as the porous support, provided that the selected material is impervious to gases other than oxygen although the material may also be impervious to oxygen. Specifically, the removal means, two examples which include manifolds and conduits, must be incapable of permeating gases other than oxygen contained in the oxygen-containing gaseous mixture. For example, when the module is utilized to separate oxygen from an oxygen-containing gaseous mixture, the removal means must form a barrier between components other than oxygen contained in oxygen-containing gaseous mixture and the oxygen product.

Applicants have discovered a new class of mixed conducting oxides which provide unexpectedly low CTE (coefficient of thermal expansion) values and are particularly suited toward use in the dense mixed conducting oxide layer as well as the channel-free porous support of the planar solid-state membrane units of the present modules. The mixed conducting oxides are represented by the formula $La_xSr_{x'}Co_yFe_{y'}Cu_{y''}O_{3-z}$ wherein $1.1>x+x'>0.9$, $1.1>y+y'+y''>0.9$ with the proviso that $0<y'\leq 0.4$ and $0<y''\leq 0.4$, and A' is selected from strontium, barium, calcium and magnesium. Again, z is a number which renders the composition charge neutral.

The planar dense mixed conducting oxide layer is preferably formed from a mixed conducting oxide selected from the group consisting of $La_{0.2}Ba_{0.8}Co_{0.8}Fe_{0.2}O_{3-z}$, $Pr_{0.2}Ba_{0.8}Co_{0.8}Fe_{0.2}O_{3-z}$, $La_{0.2}Ba_{0.8}Co_{0.6}Cu_{0.2}Fe_{0.2}O_{3-z}$, $La_{0.2}Sr_{0.8}Co_{0.4}Fe_{0.4}Cu_{0.2}O_{3-z}$, $La_{0.4}Sr_{0.6}Co_{0.4}Fe_{0.4}Cu_{0.2}O_{3-z}$, $La_{0.3}Sr_{0.7}Co_{0.8}Fe_{0.1}Cu_{0.1}O_{3-z}$ and $SrCo_{0.4}Fe_{0.4}Cu_{0.2}O_{3-z}$ where z is a number which renders the composition charge neutral. Alternately, the planar dense layer can be formed of a mixture of one or more ionically conducting materials and one or more electron-conducting materials.

The planar solid-state modules of the present invention can be used to recover oxygen from an oxygen-containing gaseous mixture by contacting the oxygen-containing gaseous mixture with the dense mixed conducting oxide layers of the membrane units, establishing a positive oxygen partial pressure difference on opposite sides of the dense mixed conducting oxide layers of each membrane unit by producing an excess oxygen partial pressure in the feed side of the membrane unit and/or by producing a reduced oxygen partial pressure on the permeate side of the membrane unit; contacting the oxygen-containing gaseous mixture with the dense mixed conducting oxide layer of the membrane units at a temperature greater than about 300° C. to separate the oxygen-containing gaseous mixture into an oxygen permeate stream. The oxygen permeate stream passes through the channel-free porous support of each membrane unit and is subsequently collected by the removal means for discharging the oxygen product. The oxygen-depleted gaseous mixture can be recycled into the process or transferred to another process to recover its heat value, or further heated and passed through an expander.

The oxygen which has been separated from the oxygen-containing gaseous mixture can be collected or can be reacted in-situ with an oxidizable composition to form a partially oxidized product. Suitable oxygen-containing gaseous mixtures include air or any gaseous mixture containing molecular oxygen or other sources of oxygen such as $N_2O$, NO, $NO_2$, $SO_2$, $CO_2$ and the like.

The planar solid-state membrane modules of the present invention can also be used to carry out a variety of reactions such as oxidative coupling, chemical deoxygenation, oxidative dehydrogenation and the like. For example, the modules can be utilized to produce synthesis gas by oxidation of methane, natural gas or other light hydrocarbons, or to produce unsaturated compounds from saturated hydrocarbon compounds. According to this embodiment, an oxygen-containing gaseous mixture is introduced into the channel-free porous support of the membrane unit and the gas to be oxidized is placed in contact with the dense mixed conducting oxide layer of each membrane unit of the membrane module. At operating temperatures in excess of 300° C., oxygen is reduced to oxygen ions which are transported across the dense mixed conducting oxide layer to the exterior surface of the membrane unit. The feedstream to be oxidized is placed in flow communication with the exterior surface of the dense mixed conducting oxide layer of membrane unit wherein oxygen ions react with a desired feedstock thereby oxidizing the feedstock and releasing electrons which are transported across the dense mixed conducting oxide layer in a direction opposite the flow of oxygen ions.

The planar solid-state membrane modules of the present invention can be conveniently utilized to remove trace amounts of oxygen from an oxygen-containing gaseous mixture such as crude argon wherein the gaseous mixture is contacted with the dense mixed conducting oxide layer of each membrane unit and a reducing gas such as hydrogen or methane is contacted with the channel-free porous support wherein the oxygen residing in the gaseous mixture is converted to water or water and carbon dioxide, respectively. The oxygen-containing gaseous mixture which is depleted in oxygen is conveniently collected at pressure.

When the planar solid-state membrane modules of the present invention are utilized for carrying out the above-mentioned partial oxidation reactions, a catalyst suitable for carrying out the desired reaction is typically situated contiguous to the dense mixed conducting oxide layer of the membrane units on a side opposite the channel-free porous support. Suitable reactants and partial oxidation catalysts are well known in the art.

Applicants' invention can be more readily understood by referring to the Detailed Description of the Invention and the Figures which are attached hereto.

BRIEF DESCRIPTION OF THE DRAWINGS

In the drawings, which illustrate what is currently considered to be the best mode for carrying out the invention.

DETAILED DESCRIPTION OF THE INVENTION

Figure 1:
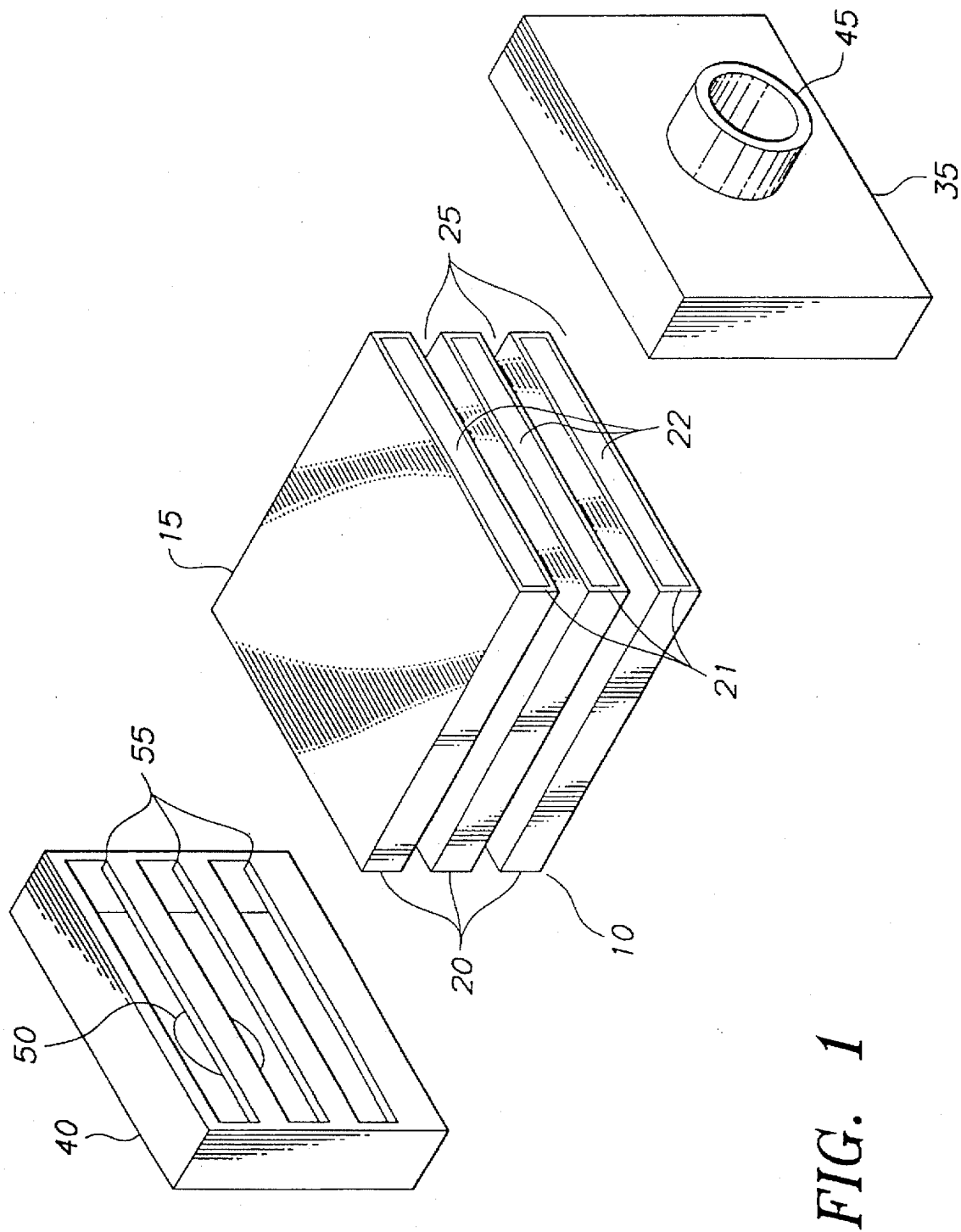
FIG. 1 is a perspective view of one embodiment of a planar solid-state membrane module which comprises a plurality of planar membrane units formed from a dense mixed conducting oxide layer which is supported by, and contiguous with a channel-free porous support having connected through porosity. The removal means for discharging oxygen from each planar membrane unit comprises two conventional manifolds.

FIG. 1 is an exploded perspective view of an embodiment of a planar solid-state membrane module comprising a plurality of planar membrane units. Planar solid-state membrane module 10 possess an array 15 of gas separation membrane units 20 which are separated by passageways 25. Each membrane unit 20 comprises a channel-free porous support 22 and a dense mixed conducting oxide layer 21. Structures 35 and 40 adjacent opposite entrance and exit surfaces of the membrane array of modules 15 define spaced entrance and exit manifolds having receiving structures 55 into which membrane units 20 are received. Thus, manifolds 35 and 40 are in flow communication with channel-free porous supports 22 of each membrane unit 20 within the array of membrane units 15. Outlet lines 45 and 50 are in flow communication with structures 35 and 40 and are adapted to carry process streams to and from the planar solid-state membrane module 10.

The embodiment according to FIG. 1 can be conveniently utilized to separate oxygen from an oxygen-containing gaseous mixture by introducing the oxygen-containing gaseous mixture through passageways 25 and into contact with the dense mixed conducting layers 21 of each of the membrane units 20. The driving force for separating oxygen from an oxygen-containing gaseous mixture is provided by creating a difference in oxygen partial pressure on opposite sides of the dense mixed conducting oxide layer 21 of each membrane unit 20.

An oxygen partial pressure difference on opposite sides of dense mixed conducting oxide layer 21 can be created by compressing the oxygen-containing gaseous mixture within passageways 25 to a pressure sufficient to recover the oxygen permeate stream at a pressure of greater than or equal to about one atmosphere. In the case of air, typical pressures range from about 75 psia to about 250 psia and the optimum pressure will vary depending upon the amount of oxygen in the oxygen-containing gaseous mixture. Conventional compressors are capable of achieving the required compression. Alternately or in combination with use of compression, a positive oxygen partial pressure difference on opposite sides of dense mixed conducting oxide layer 21 can be achieved by partially evacuating the channel-free porous support 22 by drawing a vacuum on inlets 45 or 50 of structures 35 and 40 to create a partial pressure difference sufficient to recover the oxygen product.

The oxygen which has been separated from the oxygen-containing gaseous mixture can be stored in a suitable container or utilized in another process. The oxygen permeate typically comprises pure oxygen or high purity oxygen defined as a gas generally containing at least about 90 vol. % $O_2$, preferably more than about 95 vol % $O_2$ and especially more than 99 vol. % $O_2$.

The planar solid-state membrane modules of the present invention can be used to carry out a variety of processes including the separating of any ionizable component from a feedstream wherein such ionizable component is capable of being transported through the dense mixed conducting oxide layer of the membrane units. For example, the ionizable component may be oxygen present in air wherein oxygen ions are passed through the dense mixed conducting oxide layers of the planar membrane unit. Hydrogen can also be separated from a feed stream by fabricating the dense mixed conducting oxide layer of each membrane unit from a mixed conducting oxide which is capable of transporting the ionized hydrogen species.

The membrane module 10 can be readily utilized for producing synthesis gas. The planar solid-state membrane module 10 is heated to a temperature ranging from 300° to 1200° C., preferably from 500° to 900° C. The upper operating temperature is limited only by the temperature at which the compositions of the membrane unit begin to sinter. A feedstock comprising light hydrocarbons such as methane, natural gas, ethane or any available light hydrocarbon mixture is introduced into passageways 25 and an oxygen-containing gaseous mixture is introduced into the channel-free porous supports 22 of each membrane unit 20 by passage into either structure 35 or structure 40 via inlet 45 or inlet 50. The oxygen-containing gaseous mixtures flows into channel-free porous supports 22 of each membrane unit 20 wherein oxygen is ionized and passed across the dense mixed conducting oxide layer 21 of each membrane unit 20. The feedstock contacts oxygen ions which are formed at the surface of dense layers 21 resulting in formation of synthesis gas.

The feedstock to be utilized in carrying out the synthesis gas reaction is preferably natural gas which may be utilized straight from the wellhead at pressure or produced industrially. A typical industrially produced feedstock comprises a composition having about 70 percent by weight of methane, about 10 percent by weight of ethane, 10 percent to 15 percent by weight of carbon dioxide with the balance comprising smaller amounts of propane, butane and nitrogen. The feedstock may also comprise a mixture of $C_1$–$C_6$ hydrocarbons which may optionally be diluted with any inert diluent such as nitrogen, helium and the like. Suitable catalysts which can be deposited onto the dense mixed conducting oxide layer include conventional catalysts for producing synthesis gas as are well known in the art.

The membrane module according to FIG. 1 may also be utilized to produce unsaturated hydrocarbons. The process is conducted in a manner analogous to the preparation of synthesis gas wherein the membrane module 10 is heated to a temperature in excess of 300°, preferably from 500° to 1000° C. Thus, the feedstock and oxygen-containing gaseous mixture are passed through the membrane module in the same path as the feedstock and oxygen-containing gaseous mixture discussed in the synthesis gas reaction description.

The feedstock may comprise any fully or partially saturated hydrocarbon which is susceptible to dehydrogenation and which is stable at operating temperatures in either its saturated or unsaturated form. Representative feedstocks include aliphatic hydrocarbons containing 1 to 6 carbon atoms, cycloaliphatic hydrocarbons containing 5 or 6 carbon atoms, aromatic compounds having an aliphatic moiety of 2 to 6 carbon atoms. Preferred feedstocks include ethane, propane, ethylbenzene and mixtures containing the same. The feedstock may optionally be diluted with any inert diluent such as nitrogen, helium and the like. Suitable catalysts which may be placed on the dense mixed conducting oxide layer on each membrane unit on a side opposite the channel-free porous support include Shell 105 catalyst which comprises about 90% iron oxide, 4% chromium oxide and 6% potassium carbonate.

Figure 2:
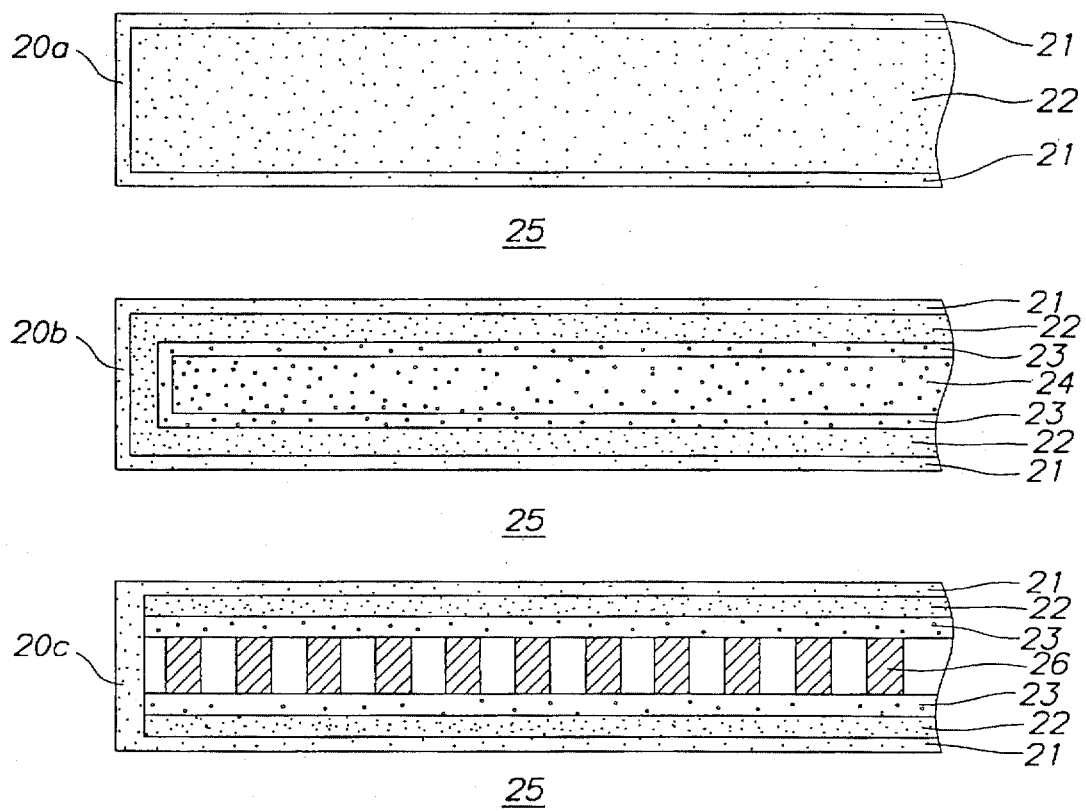
FIG. 2 is a sectional view of the planar solid-state membrane module of FIG. 1 which illustrates three planar solid-state membrane unit embodiments, each embodiment which comprises a dense mixed conducting oxide layer which is supported by and contiguous with a channel-free porous support have connected through porosity.

FIG. 2 presents a sectional view of the planar solid-state membrane module of FIG. 1 and illustrates three general embodiments of membrane units which are suitable for practicing the present invention. Referring to FIG. 2, membrane units 20a, 20b, and 20c each possess a dense mixed conducting oxide layer 21 which is situated contiguous to channel-free porous support 22. Thus, membrane unit 20a represents the most general membrane unit of the planar solid-state membrane modules of the present invention.

Membrane unit 20b of FIG. 2 presents an alternate embodiment which comprises a symmetrical composite arrangement of layers bounded by dense mixed conducting oxide layer 21. Dense mixed conducting oxide layer 21 is contiguous to support layer 22. Situated adjacent to and contiguous with the support layer 22 is a first porous layer 23 and a second porous layer 24. As noted in the cross-section of membrane unit 20b, the planar solid-state membrane unit possesses mirror symmetry wherein the second porous layer 24 forms the interior portion of the membrane unit onto which a first porous layer 23 is deposited on each side of second porous layer 24. Thus, channel-free porous support 22 and first and second porous layers 23 and 24, respectively, provide an integral support for the dense mixed conducting oxide layer which can withstand the pressure differential exerted on opposite sides of the dense mixed conducting layer of the membrane unit during operating conditions.

The first and second porous layers of membrane unit 20b can be individually deposited such that the second porous layer 24 has a larger average pore radii than the first porous layer 23. Any number of porous layers can be used such that the respective porous layers form a gradient having an average pore radius which increases moving away from the interface with channel-free porous support 22. The outside edges of each porous layer comprises a dense mixed conducting oxide such that a continuous dense mixed conducting oxide layer bounds the membrane unit. A suitable technique for manufacturing ultrathin solid state membranes is presented in U.S. Pat. No. 5,332,597 issued Jul. 24, 1994, which is assigned to Air Products and Chemicals, Inc., Allentown, Pa. Alternately, the membrane unit 20b can be fabricated such that each respective porous layer possess an average pore radius which progressively increases as a function of distance from the channel-free porous support.

Membrane unit 20c represents an adaptation of membrane unit 20b wherein the second porous layer 24 of membrane unit 20b is replaced by a channeled layer 26. Channeled layer 26 provides channels for receiving process streams. For example, when the planar solid-state membrane module is operated to separate oxygen from an oxygen-containing gaseous mixture, oxygen permeates dense mixed conducting oxide layer 21 and passes through channel-free porous support 22 and porous layer 23 into the channels of channeled layer 26 for collection via inlets 45 and 50 of structures 35 and 40 as presented in FIG. 1.

Figure 3:
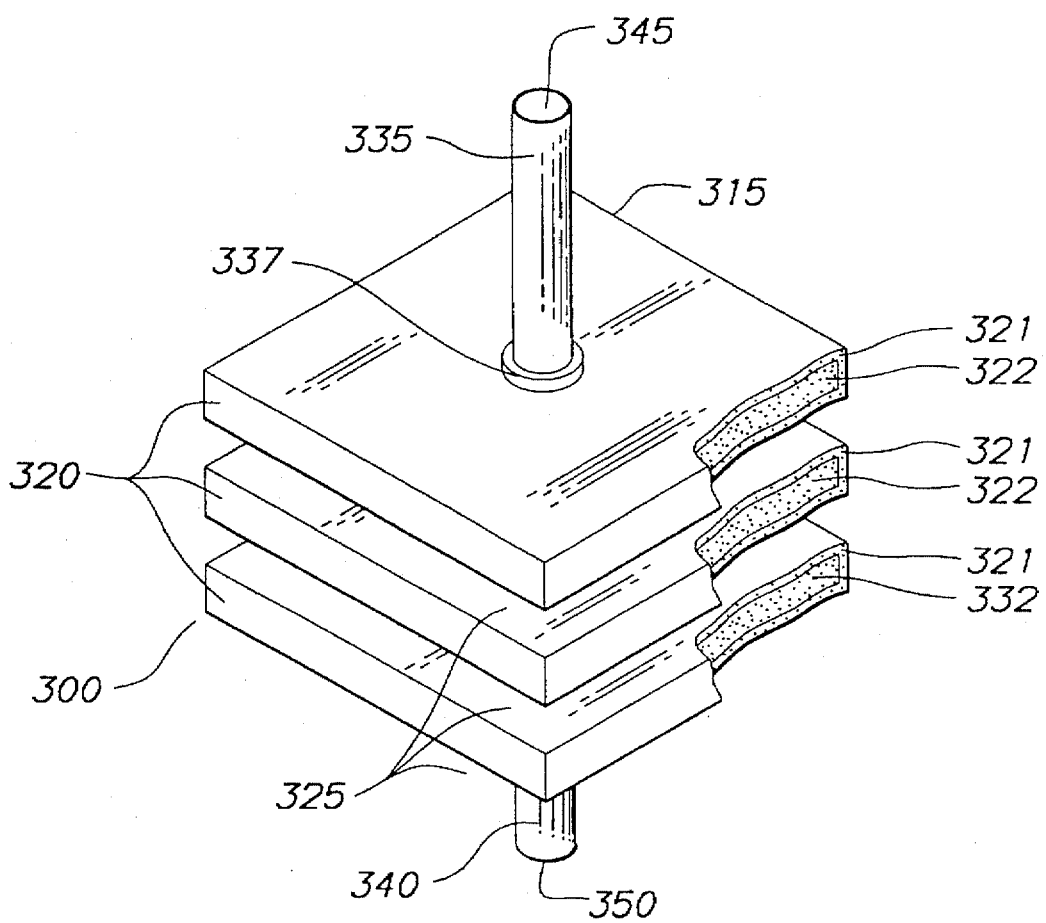
FIG. 3 is a perspective view of another embodiment of a planar solid-state membrane module which comprises a plurality of planar solid-state membrane units formed from a dense mixed conducting oxide layer which is supported by and contiguous with a channel-free porous support having connected through porosity. The removal means for discharging oxygen from each planar membrane unit comprises a conduit which traverses each planar membrane unit and which is in flow communication with the channel-free porous support of each membrane unit of the planar solid-state membrane module.

FIG. 3 presents an exploded perspective view of another embodiment of the present invention. Planar solid-state membrane module 300 comprises an array 315 of membrane units 320 wherein each membrane unit comprises a dense mixed conducting oxide layer 321 which is supported by and contiguous with a channel-free porous support 322 having connected through porosity. The plurality of membrane units 320 are separated by passageways 325. The array of planar solid-state membrane units 315 is traversed by conduit 335 having opening 345 and conduit 340 having opening 350. Conduits 335 and 340 are placed in flow communication with channel-free porous supports 322 of each membrane unit 320 and are secured to the membrane array by conduit collar 337 and a conduit collar (not shown) associated with conduit 340. Conduits 335 and 340 as well as collars are typically constructed of the same composition as the dense mixed conducting oxide layer and porous support.

Conduit collar 337 provides a gas-tight seal between conduit 335 and the array 315 of membrane units thereby preventing leakage of oxygen or other gases from within the planar cells or between contiguous planar cells. The collar 337 can be formed from a wide variety of materials such as oxidation-resistant ceramics, such as ceria or calcia-doped ceria having a thermal expansion coefficient which is compatible with the composite layers of solid state membrane unit 320 with which the collar is associated. The material used for the collars may also be ion-conducting. The collar 337 may be secured to the conduit 335 and the array 315 of membrane units by cosintering or by applying a high temperature sealing material such as an aluminosilicate glass, metal brazes, or composites of both.

The embodiment according to FIG. 3 can be conveniently utilized to separate oxygen from an oxygen-containing gaseous mixture by introducing the oxygen-containing gaseous mixture through passageways 325 and into contact with the dense mixed conducting layers 321 of each of the membrane units 320. The driving force for separating oxygen from an oxygen-containing gaseous mixture is provided by creating a difference in oxygen partial pressure on opposite sides of the dense mixed conducting oxide layer 321 of each membrane unit 320. An oxygen partial pressure difference on opposite sides of dense mixed conducting oxide layer 321 can be created by compressing the oxygen-containing gaseous mixture within passageways 325 to a pressure sufficient to recover the oxygen permeate stream at a pressure of greater than or equal to about one atmosphere. Typical pressures range from about 75 psia to about 250 psia and the optimum pressure will vary depending upon the amount of oxygen in the oxygen-containing gaseous mixture. Conventional compressors are capable of achieving the required compression. Alternately or in combination with compression, a positive oxygen partial pressure difference on opposite sides of dense mixed conducting oxide layer 321 can be achieved by partially evacuating the channel-free porous support 322 by drawing a vacuum on inlets 345 or 350 of conduits 335 and 340 to create a partial pressure difference sufficient to recover the oxygen product.

The oxygen which has been separated from the oxygen-containing gaseous mixture can be stored in a suitable container or utilized in another process. The oxygen permeate typically comprises pure oxygen or high purity oxygen defined as a gas generally containing at least about 90vol. % $O_2$, preferably more than about 95 vol % $O_2$ and especially more than 99 vol. % $O_2$.

When the planar solid-state membrane module of FIG. 3 is utilized for producing synthesis gas, the membrane module is heated to a temperature ranging from 300° to 1200° C., preferably from 500° to 900° C. A feedstock comprising light hydrocarbons such as methane, natural gas, ethane or any available light hydrocarbon mixture is introduced into passageways 325 and an oxygen-containing gaseous mixture is introduced into the channel-free porous supports 322 of each membrane unit 320 by passage into conduit 335 via conduit inlet 345. The oxygen-containing gaseous mixtures flows into channel-free porous supports 322 of each membrane unit 320 wherein oxygen is ionized and passed across the dense mixed conducting oxide layer 321. The feedstock contacts oxygen ions which are formed at the surface of dense layers 321 resulting in formation of synthesis gas.

The feedstock to be utilized in carrying out the synthesis gas reaction is preferably natural gas which may be utilized straight from the wellhead or produced industrially. A typically industrially produced feedstock comprises a composition having about 70 percent by weight of methane, about 10 percent by weight of ethane, 10 percent to 15percent by weight of carbon dioxide with the balance comprising smaller amounts of propane, butane and nitrogen. The feedstock may also comprise $C_1$–$C_6$ hydrocarbons which may optionally be diluted with any inert diluent such as nitrogen, helium and the like. Suitable catalysts which can be deposited onto the dense mixed conducting oxide layer include conventional catalysts are well known in the synthesis gas as are well known in the art.

The membrane module according to FIG. 3 may also be utilized to produce unsaturated hydrocarbons. The process is conducted in a manner analogous to the preparation of synthesis gas wherein the membrane module is heated to a temperature in excess of 300° C., preferably from 500° to 1000° C. Thus, the feedstock and oxygen-containing gaseous mixture are passed through the membrane module in the same path as the feedstock and oxygen-containing gaseous mixture discussed in the synthesis gas reaction description.

The feedstock may comprise any fully or partially saturated hydrocarbon which is susceptible to dehydrogenation and which is stable at operating temperatures in either its saturated or unsaturated form. Representative feedstocks include aliphatic hydrocarbons containing 1 to 6 carbon atoms, cycloaliphatic hydrocarbons containing 5 or 6 carbon atoms, aromatic compounds having an aliphatic moiety of 2 to 6 carbon atoms. Preferred feedstocks include ethane, propane, ethylbenzene and mixtures containing the same. The feedstock may optionally be diluted with any inert diluent such as nitrogen, helium and the like. Suitable catalysts include Shell 105 catalyst which comprises about 90% iron oxide, 4% chromium oxide and 6% potassium carbonate.

Figure 4:
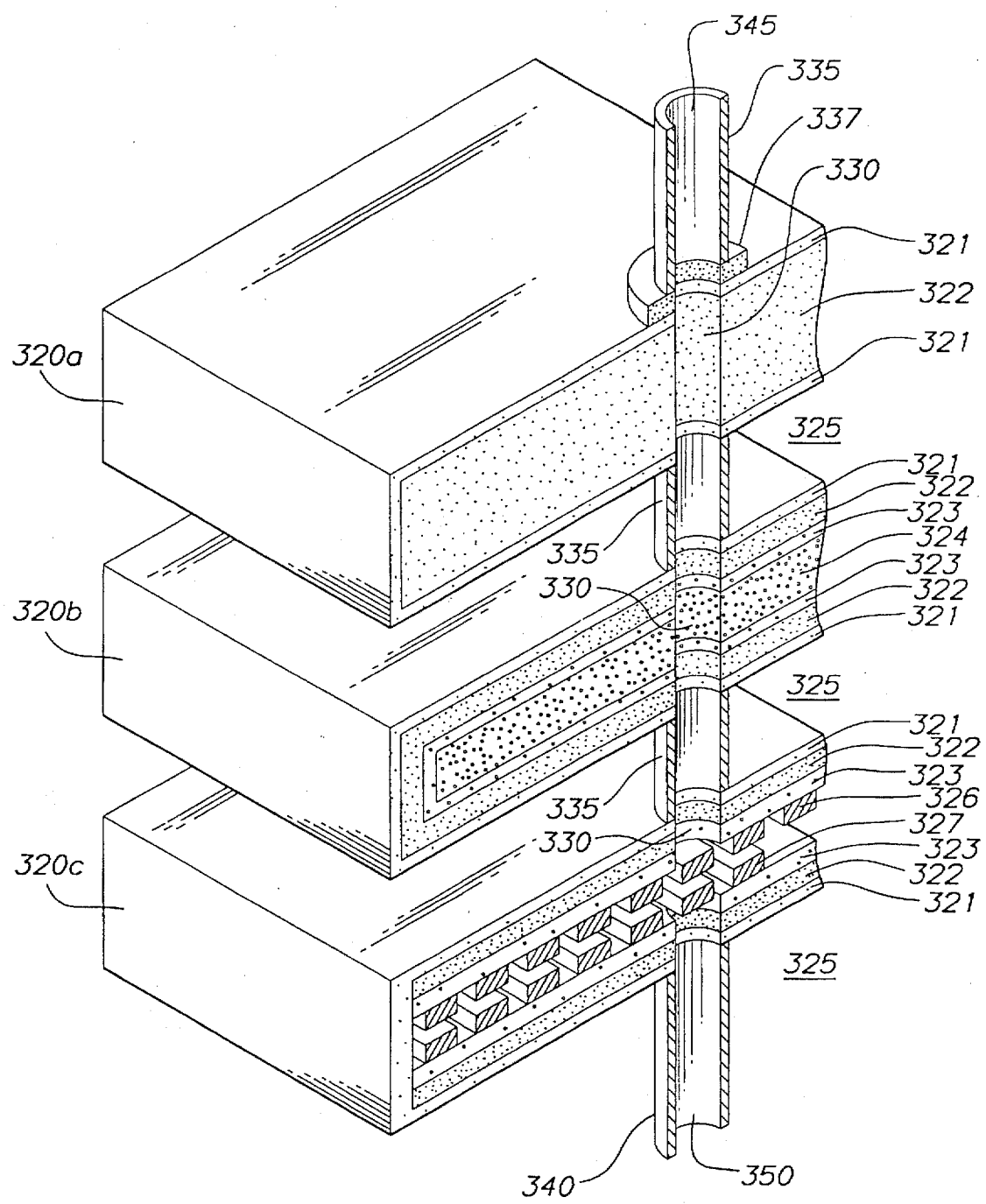
FIG. 4 is an exploded view of the planar solid-state membrane module of FIG. 3 which illustrates three membrane unit embodiments, each which presents a dense mixed conducting oxide layer which is supported by a channel-free porous support having connected through porosity.

FIG. 4 is an exploded view of the planar solid-state membrane module of FIG. 3 which illustrates three planar solid-state membrane unit embodiments, each which presents a dense mixed conducting oxide layer 321 which is supported by a channel-free porous support 322 have connected through porosity. Membrane units 320a, 320b, and 320c each possess a dense mixed conducting oxide layer 321 which is situated contiguous to channel-free porous support 322. Thus, membrane unit 320a represents the most general membrane unit of this embodiment.

Membrane unit 320b of FIG. 4 presents an alternate embodiment wherein the membrane unit 320b comprises a symmetrical arrangement of layers bounded by dense mixed conducting oxide layer 321. Dense layer 321 is contiguous to support layer 322. Situated adjacent to and contiguous with the support layer 322 are a first porous layer 323 and a second porous layer 324. Membrane unit 320b possess symmetry wherein the second porous layer 324 forms the interior layer of the membrane unit onto which a first porous layer 323 is deposited on both sides of the second porous layer 324. Thus, channel-free porous support 322 and first and second porous layers 323 and 324, respectively provide an integral support for the dense separating layer which can withstand the pressure differential exerted on opposite side of the membrane unit during operating conditions. The porous layers of this embodiment can be fabricated utilizing the methods presented under FIG. 2.

Figure 5:
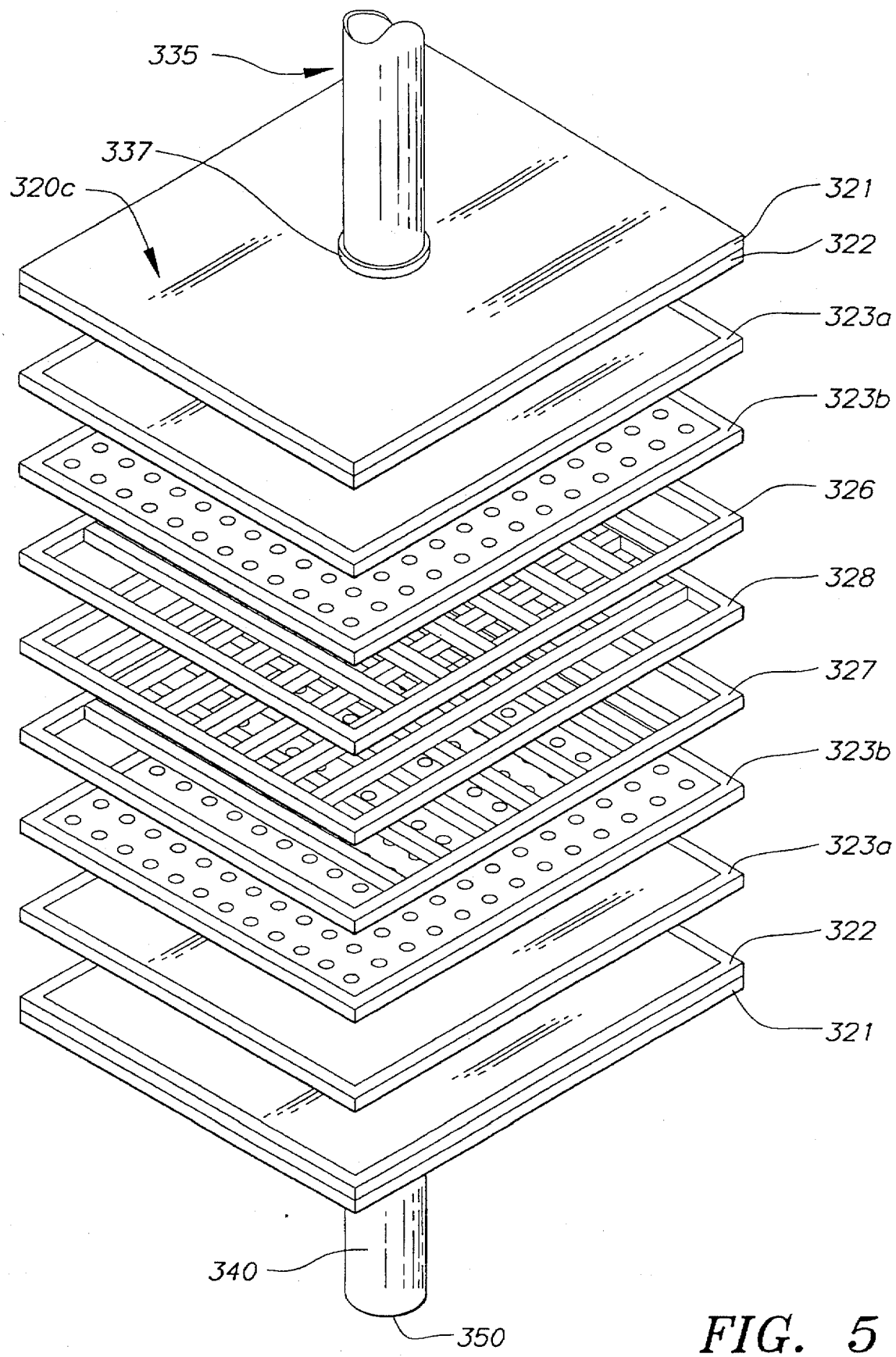
FIG. 5 is an exploded view of a preferred embodiment of a planar solid-state membrane unit suitable for incorporation into the planar solid-state membrane module illustrated in FIG. 3.

Membrane unit 320c represents an adaptation of membrane unit 320b wherein the second porous layer 324 of membrane unit 320b is replaced by channeled layers 326, 327 and 328 as shown in FIG. 5. Channeled layer 328 possesses channels which are perpendicular to the channels of channeled layers 326 and 327 and is situated between channeled layers 326 and 327 creating a network of channels which are in flow communication with conduits 335. Thus, when the planar solid-state membrane module is operated to separate oxygen from an oxygen-containing gaseous mixture channeled layers 326, 327 and 328 provide channels for receiving oxygen which has permeated dense separating layer 321, passed through channel-free porous support 322 and porous layer 323 into the channels of channeled layer 326 and into collection space 330 for collection as described in FIG. 3. Collection space 330 comprises a void space within each membrane unit, which space 330 is in flow communication with conduits 335 and 340.

FIG. 5 presents an exploded view of a preferred embodiment of a planar membrane unit suitable for incorporation into the planar solid-state electrochemical module illustrated in FIG. 3. Membrane unit 320c possesses a symmetrical array of layers wherein the outermost layer of the membrane unit comprises a dense layer 321 and the innermost layer is a third channeled layer 328. The third channeled layer is contiguous to a first channeled layer 326 and a second channeled layer 327 wherein the channels of third channeled layer 328 are positioned is a direction substantially perpendicular to the channels in channeled layers 326 and 327. In an alternate embodiment, channeled layer 328 possesses a plurality of radial channels which are placed in flow communication with the conduits. Such radial channels may resemble the spokes of a wheel wherein such radial channels extend out to, but not through the dense mixed conducting oxide edge of such layer. Each respective layer comprises an edging formed from a dense mixed conducting oxide such that a continuous surface of dense mixed conducting oxide is formed on the surfaces of the membrane unit when the respective layers are fabricated into a planar solid-state membrane module as discussed in the Experimental Section.

The channels of channels layers 326, 327 and 328 are in flow communication with conduits 335 and 340. Conduit collar 337 serves to secure conduit 335 to membrane unit 320c. Situated between channel-free porous support 322 and the first channeled layer 326 are a first porous layer 323a and second porous layer 323b. Under operating conditions, an oxygen-containing gaseous mixture is placed in flow communication with dense layer 321 and oxygen is ionized and transferred through the dense layer 321 passing through the channel-free porous support 322, through first porous layer 323a, second porous layer 323b and into channeled layers 326, 327 and 328 which are in flow communication with conduits 335 and 340.

Figure 6:
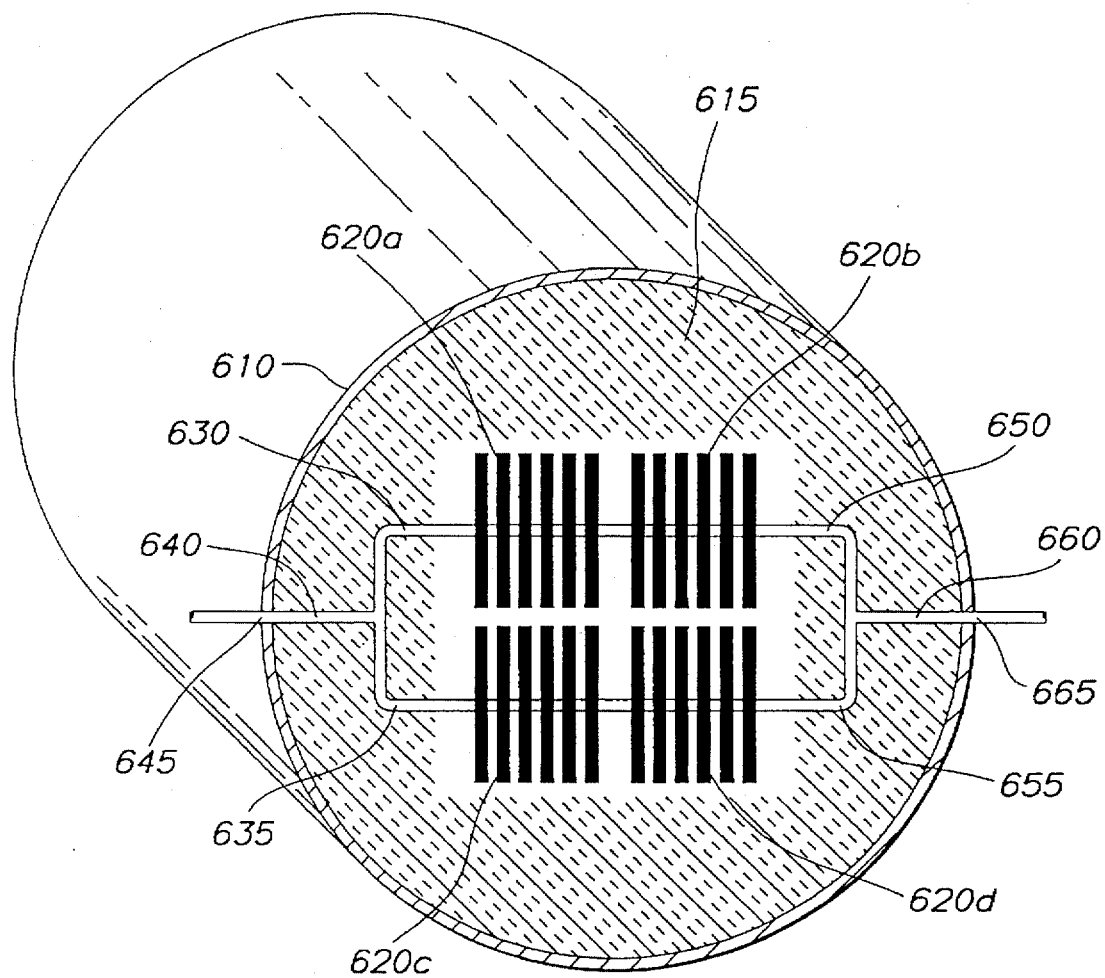
FIG. 6 is a top view of a housing suitable for receiving the planar membrane modules of the present invention which provides a means for introducing required process streams into contact with the planar solid-state membrane modules and a means for discharging process streams from the plurality of planar membrane units of the planar solid-state membrane modules.

FIG. 6 presents a top view of a housing for receiving the planar membrane modules of the present invention. Housing structure 610, typically formed from a conventional high-temperature stainless steel or super alloy pipe, conduit or pressure vessel is sized to a diameter suitable for receiving planar module unit 620a, 620b, 620c and 620d. As depicted in FIG. 6, planar module units 620a and 620b are linked in series and planar module 620c and 620d are linked in series. Housing structure 610 is packed with insulation 615. The heated oxygen-containing gaseous mixture is caused to flow within housing structure 610 and such gaseous mixture is placed in flow communication with the dense mixed conducting oxide layers of the respective membrane units of the gas separation modules 620a, 620b, 620c and 620d. Oxygen residing at the surface of the dense separating layer is caused to ionize and transfer through and into the dense mixed conducting oxide layer of each membrane unit upon application of an oxygen partial pressure gradient and to recombine into molecular oxygen in the channel-free porous support of each respective membrane unit. Oxygen separated from the oxygen-containing gaseous mixture within membrane modules 620a and 620b is collected via conduits 630 and 650. Oxygen separated by gas separation modules 620c and 620d is collected in conduits 635 and 655. Thus, oxygen separated from the plurality of planar modules is collected in conduits 640 and 660, which conduits exit housing 610 via housing openings 645 and 665.

Planar solid-state membrane modules 620a, 620b, 620c and 620d which comprise a plurality of planar solid-state membrane units are secured to housing structure 610 by supporting means (not shown) as is conventionally known in the art. The oxygen-containing gaseous mixture can be heated by any conventional means including gas-fired direct combustion and heat exchangers.

Having described in detail the embodiments of the planar solid-state membrane modules which Applicants regard as their invention, the following information is provided to further describe the membrane units which form the membrane modules as well as the materials and methods for making the same.

Thin dense layers of the desired multicomponent metallic oxide having a thickness ranging from 100 microns to about 0.01 microns in thickness can be deposited onto the enumerated porous layers by known techniques. For example, the membrane composites can be manufactured by first forming a porous body from relatively coarse sized particles of the multicomponent metallic oxide. A slurry of finer particles of the same material or a similar, compatible multicomponent metallic oxide may then be coated onto the porous material and cured to the green state, the two layer system then being fired to form the composite membrane.

The contiguous porous and dense layers of the present membranes may be formed from one or more multicomponent metallic oxides comprising an oxide of at least two different metals or a mixture of at least two different metal oxides wherein the multicomponent metallic oxide demonstrates electron conductivity as well as oxygen ion conductivity at elevated temperatures. Multicomponent metallic oxides suitable for practicing the present invention are referred to as "mixed" conducting oxides because such multicomponent metallic oxides conduct electrons as well as oxygen ions at elevated temperatures.

The mixed conducting oxides suitable for practicing the present invention may be prepared according to conventional methods including mixing and firing a desired stoichiometric ratio of the respective metallic oxides making up the mixed conducting oxide, thermally decomposing nitrates and acetates, and utilizing the citric acid preparation method. Each of these methods is well known in the art and is suitable for making the mixed conducting oxides of the present invention.

The planar membrane units of the present invention can be prepared by applying a dense layer of a desired mixed conducting oxide onto the desired porous substrate by conventional chemical vapor deposition techniques followed by sintering to obtain the desired dense layer. In order to obtain an optimal dense coating, a smaller average pore radius in the surface of the channel-free porous support may be used compared to the average pore radius in the bulk. This may be achieved by using two or more porous layers which differ in properties such as pore radius and porosity.

EXPERIMENTAL SECTION

The following examples are provided to further illustrate embodiments of the present invention and are not intended to limit the scope of the attached claims.

EXAMPLE 1

Stress Analysis of an Air Separation Module Comprising Composite Mixed Conducting Oxide Structures Oxygen flux through the planar membrane units of the modules of this invention created when an oxygen partial pressure gradient exists across the dense mixed conducting oxide layer of each membrane unit is inversely proportional to the thickness of the dense mixed conducting oxide layer membrane when other resistances to the flux such as those due to surface kinetics or gas phase diffusion are minimized. In order to obtain economically attractive rates of oxygen separation from air, the dense mixed conducting oxide layer of each membrane unit must be thin; generally $\leq 100$ μm thick when an oxygen partial pressure gradient of ~40–50 psi is applied across the dense mixed conducting oxide layer of a membrane unit at temperatures in excess of 800° C. When separating pure oxygen from air utilizing the claimed planar solid-state membrane modules, air at ~200–250 psig is applied to the feed side of the planar membrane units while oxygen at close to atmospheric pressure is removed from the opposite side of the dense mixed conducting oxide layer resulting in a mechanical load of ~200–250 psi (1.3–1.7 Mpa) being applied across the thickness of the dense mixed conducting oxide layer of the planar solid-state membrane unit.

The allowable stress that can be applied for a given probability of failure to a ceramic material of known characteristic strength can be calculated by using Weibull statistics. Mixed conducting oxides of the perovskite type are known to have characteristic strengths of the order of 50–150 Mpa. For example, $La_{0.2}Ba_{0.8}Co_{0.8}Fe_{0.2}O_{3-x}$ (LBCF) has a characteristic strength of ~60 Mpa and a Weibull modulus of 10.0 at ~800° C. Other mixed conducting oxides may have higher values; for example, the material designated LSFC-2 is stated to have an average strength of 120.4 MPa and a Weibull modulus of 14.5 (U. Balachandran et al., American Ceramic Society Bulletin, volume 74, No. 1, page 71, 1995), from which its characteristic strength can be estimated to be ~124 MPa. The maximum allowable applied stress for these materials can then be calculated as follows:

| Material | Characteristic Strength MPa | Weibull Modulus | Probability of Failure | Allowable Stress MPa |
| --- | --- | --- | --- | --- |
| LBCF | 60.0 | 10.0 | $10^{-8}$ | 9.5 |
| LBCF | 60.0 | 10.0 | $10^{-10}$ | 6.0 |
| LSCF-2 | 124.0 | 14.5 | $10^{-8}$ | 34.8 |
| LSCF-2 | 124.0 | 14.5 | $10^{-10}$ | 25.3 |

Therefore, to obtain economic oxygen separation rates at practical operating conditions and to ensure useful membrane reliability in service, the maximum allowable stress that can be applied across the enumerated dense mixed conducting oxide layer having a thickness of less than $\leq 100$ μm ranges from 5 to 40 MPa.

The dense mixed conducting oxide layers of the respective planar solid-state membrane unit which are less than ~100 μm in thickness must be supported to withstand the stress imposed by the operating pressure differential. The support must provide sufficient mechanical strength to prevent membrane unit failure under the operating conditions while imposing a minimum resistance to the flow of oxygen that has permeated through the dense mixed conducting oxide layer of each membrane unit. Standard mechanical calculations (Rourk and Young, Formulas for Stress and Strain, McGraw-Hill, 5th Ed., 1975) can be used to estimate the stress imposed on a supported dense mixed conducting oxide membrane layer by an applied pressure differential for various values of the ratio of the supported span dimension to the thickness of the dense mixed conducting oxide layer of the membrane unit. For a membrane unit to withstand an applied pressure differential of ~1.5 MPa, the calculated stress developed in the dense mixed conducting oxide layer is as follows:

| Support Span Dimension/ Membrane Thickness | Maximum Imposed Stress in Membrane MPa |
| --- | --- |
| 1:1 | 0.9 |
| 2:1 | 3.2 |
| 3:1 | 7.3 |
| 4:1 | 13.0 |
| 5:1 | 20.3 |
| 6:1 | 29.2 |
| 7:1 | 39.8 |

In order to obtain a viable economic membrane reliability under practical operating conditions, the maximum stress imposed on the membrane unit by the operating pressure gradient must not exceed the maximum allowable stress, which is itself a function of the material properties of the dense mixed conducting oxide layer of the membrane unit. These calculations show that the ratio of span dimension to thickness of the dense mixed conducting oxide layer and support structure must not exceed a range of ~3:1 to 6:1, depending on the strength of the dense mixed conducting oxide layer. The oxygen flux requirement for a membrane unit formed from a dense mixed conducting oxide layer having membrane thickness of $\leq 100$ μm implies a maximum span width in the contiguous porous support adjacent to the dense mixed conducting oxide membrane layer of <300–600 μm.

The porous support must also be economical to fabricate and provide minimum gas flow resistance. An optimum balance of these requirements can be achieved by using a channel-free porous support contiguous with the lower pressure side of the dense mixed conducting oxide membrane layer. Examples of suitable channel-free porous support layers are tape calendered or tape cast porous layers made by incorporating pore formers into the calendered or cast tape, such as carbon, rice flour or organic polymers, which are pyrolyzed from the green ceramic before sintering.

The dense mixed conducting oxide layer of the membrane unit may also be tape cast or tape calendered and bonded to the support in the green state by calendering or lamination under pressure. The dense mixed conducting oxide layer and channel-free porous support may then be sintered as a combined membrane unit in one firing. An alternative channel-free porous support is a ceramic reticulated foam, which may also be bonded to a tape cast or calendered dense mixed conducting oxide layer in the green state.

Alternatively, the dense mixed conducting oxide layer may be fabricated in or on the surface of the channel-free porous support by a combination of dip-coating with a slurry of mixed conducting oxide material followed by sealing the residual porosity of the thin membrane layer by organometallic chemical vapor infiltration as described in U.S. Pat. No. 5,332,597, issued Jul. 26, 1994. To minimize thermomechanical stress due to differential thermal expansion and to eliminate chemical reactivity, the support layer is optimally formed from the same composition as the mixed oxide conducting membrane layer of the membrane unit.

EXAMPLE 2

Preparation of $La_{0.2}Sr_{0.8}Co_{0.4}Fe_{0.4}Cu_{0.2}O_{3-z}$

A membrane module may be fabricated wherein the dense mixed conducting oxide layer of each membrane unit is formed from $La_{0.2}Sr_{0.8}Co_{0.4}Fe_{0.4}Cu_{0.2}O_{3-z}$. This composition was prepared by a known powder preparation technique wherein 2.05 parts by weight of $La_2O_3$, 7.42 parts by weight of $SrCO_3$, 1.88 parts by weight of CoO, 2.01 parts by weight of $Fe_2O_3$ and 1.00 parts by weight of CuO was ball milled for 12 hours. The mixture was then fired in air to 1000° C. for 24 hours followed by cooling to room temperature. The mixture was then ground by ball milling, remixed and retired in air to 1000° C. for 24 hours followed by cooling to room temperature. The material possessed a perovskite crystal structure as determined by X-ray diffraction. The perovskite was air milled to ~1–5 μm particle size, and combined with a plasticizer, binder and toluene solvent to form a slip suitable for tape casting.

Figure 7:
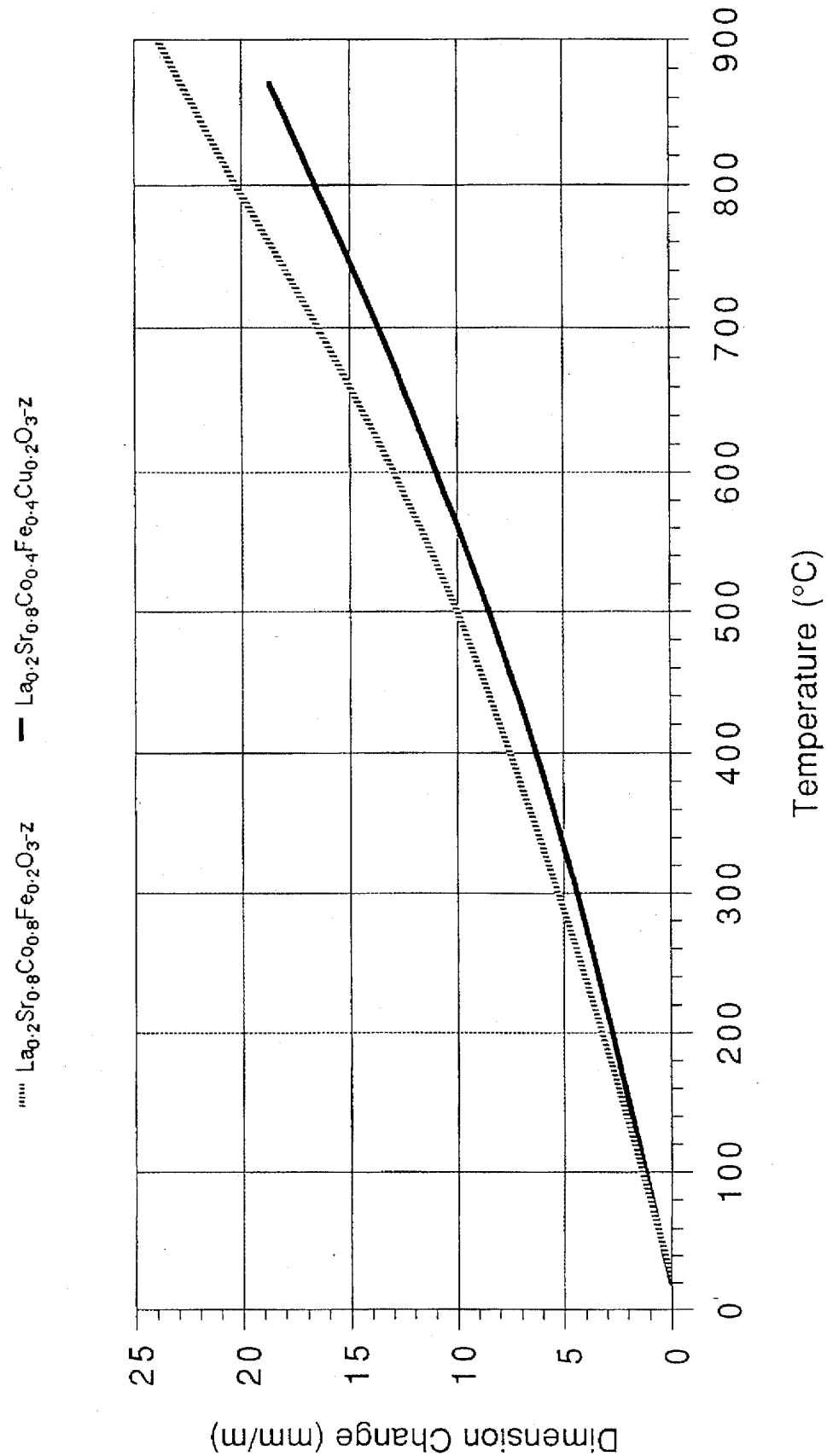
FIG. 7 illustrates the dimensional changes of a preferred mixed conducting oxide, $La_{0.2}Sr_{0.8}Co_{0.4}Fe_{0.4}Cu_{0.2}O_{3-x}$, as a function of temperature thereby illustrating unexpectedly improved control of the coefficient of thermal expansion when copper is introduced into the Perovskite structure.

This composition as well as compositions represented by the generalized formula $La_xA'_{x'}Co_yFe_{y'}Cu_{y''}O_{3-z}$ wherein $1.1 > x+x' > 0.9$, $1.1 > y+y'+y'' > 0.9$, $0y' \leq 0.4$ and $0 < y'' \leq 0.4$, A' is selected from strontium, barium or calcium, and z is a number which renders the mixed conducting oxide charge neutral, exhibit unexpectedly low changes in expansion as a function of temperature as evidenced by FIG. 7. FIG. 7 compares the dimension change as a function of temperature for the instant composition versus a similar composition which does not contain copper. The plot shows that the instant composition provides unexpectedly improved control over dimensional change when copper is introduced into a mixed conducting oxide containing cobalt and iron in the enumerated stoichiometry. This unexpected improvement holds over the entire range of compositions contemplated by the generalized formula.

EXAMPLE 3

Fabrication of a Planar Solid-State Membrane Module by Tape Casting

The membrane units of the planar solid-state membrane modules illustrated in FIGS. 4 and 5 comprising a dense mixed oxide conducting layer and a channel-free porous support, plus two additional porous layers adjacent to the channel-free porous support, and a further two channeled layers adjacent to the outermost porous layer are fabricated in the following manner.

A slip prepared according to Example 2 was tape cast onto a glass substrate and allowed to air dry at ambient conditions to produce a ~100 μm thick green tape. Approximately 30% solids content cornstarch was added to a second preparation of the casting slip, and a second tape ~100 μm thick was cast, dried and laminated under pressure to the first tape. This combination, when pyrolyzed to remove the cornstarch and binders and further fired at higher temperature, produces a membrane unit comprising a dense mixed conducting oxide and a channel-free porous support. The channel-free porous support has an average pore diameter of ~20 μm.

An additional porous layer was prepared by tape casting a slip with a higher added amount of cornstarch (to produce larger pore diameters in this first porous layer). A second additional porous layer was produced by punching holes in a further section of green tape to produce a perforated layer. These two additional porous layers were further laminated to the dense and channel-free porous support layers as illustrated in FIGS. 4 and 5.

First and second channeled layers were fabricated from the green tape cast material by punching to produce the pattern of channels shown in FIGS. 4 and 5, which facilitate the collection and distribution of the permeated oxygen into the conduit. These layers were laminated to the outermost porous layers of the sections produced in (a) and (b), to make up the illustrated structures. Edge strips of green tape were further laminated to the edges of the assembly to provide edge seals for the fully fired module.

To form a conduit and a means for collecting the oxygen separated by the module, a hole was punched through the center of the large parallel faces of the assembled membrane module. External conduits, pressed from the same mixed conducting oxide as the dense mixed conducting oxide layer, were sealed to the faces of the assembled membrane module by conventional laminating techniques. The completed module assembly was carefully pyrolyzed at 300°–400° C., to remove the rice flour and binders etc., and then further fired in air at ~1025° C. to produce a membrane module comprising a dense mixed conducting oxide layer having no connected through porosity which is contiguous to a channel-free porous support layer having connected through porosity and containing internal porous and channeled layers to facilitate collection and distribution of the permeated oxygen to the attached conduits.

The fully fired membrane module was then heated to 850° C., and air at 250 psig was passed over its outer surfaces. A vacuum pump was connected to the conduit and >99.95% pure oxygen was withdrawn from the interior of the membrane module via the conduit.

EXAMPLE 4

Fabrication of a Planar Solid-State Membrane Module by Tape Calendering

A second membrane module was fabricated as described in Example 3, except the dense mixed conducting oxide layer and the contiguous channel-free porous support are produced by tape calendering. The mixed conducting oxide powder was mixed with a suitable binder and plasticizer and milled in a high shear mill. The energy consumed by the milling process produced a plastic mass which was then fed to a calendering device to produce a thin rolled green tape. A second batch of powder was milled with binder and plasticizer. Rice flour was added to the hot plastic mass. The mix was tape calendered and laminated onto the first green tape in one operation to produce a composite tape of ~500 μm thickness which was assembled with the additional porous and channeled layers as described in Example 3. The assembled structure was then fired and used to separate oxygen from air as described in Example 3.

The planar solid-state membrane modules of the present invention provide an interconnected series of planar membrane units which maintain pneumatic integrity during operation. Moreover, the planar solid-state membrane modules overcome problems associated with manifolding and fabrication by eliminating the channeled layer adjacent to the dense mixed conducting oxide layer found in prior art membrane units. Many modifications of the illustrated planar embodiments may be made without departing from the spirit and scope of the invention as recited by the claims.

We claim:

1. A module for separating oxygen from an oxygen-containing gaseous mixture comprising a plurality of planar solid-state membrane units, each planar solid-state membrane unit which comprises a channel-free planar porous support having connected through porosity which is in contact with a contiguous planar dense mixed conducting oxide layer having no connected through porosity and a channeled layer which is contiguous to the channel-free planar porous support on a side opposite the dense mixed conducting oxide layer, wherein the planar dense mixed conducting oxide layer is in flow communication with the oxygen-containing gaseous mixture to be separated and wherein the planar channel-free porous support of each membrane unit is in flow communication with a removal means for discharging oxygen which has been separated from the oxygen-containing gaseous mixture by permeation through the planar dense mixed conducting oxide layer of each membrane unit and passage into the removal means via the planar channel-free porous support of each membrane unit.

2. The module of claim 1 wherein each membrane unit further comprises a first planar porous layer having a predetermined average pore radius which is contiguous to the planar channel-free porous support on a side opposite the planar dense mixed conducting oxide layer.

3. The module of claim 2 wherein each membrane unit further comprises a first channeled layer which is contiguous to the first planer porous layer on a side opposite the channel-free planar porous support.

4. The module of claim 3 wherein each membrane unit further comprises a second planar porous layer having a predetermined average pore radius which is situated between the first planar porous layer and the first channeled layer wherein the average pore radius of the first planar porous layer is smaller than the average pore radius of the second planar porous layer.

5. The module of claim 4 wherein each membrane unit further comprises a second channeled layer which is contiguous to the first channeled layer on a side opposite the second planar porous layer.

6. The module of claims 3, 4 or 5 wherein the removal means comprises a conduit which traverses each planar membrane unit of the module.

7. The module of claims 3, 4 or 5 wherein the removal means comprises a manifold.

8. The module of claim 5 wherein the planar dense mixed conducting oxide layer has a thickness ranging from 0.01 micrometer to about 500 micrometers.

9. The module of claim 8 wherein the planar channel-free porous support comprises pores having a diameter of less than 5 times the thickness of the planar dense mixed conducting oxide layer.

10. The module of claim 9 wherein the dense mixed conducting oxide layer comprises a mixed conducting oxide and the channel-free porous support comprises a mixed conducting oxide.

11. The module of claim 10 wherein the mixed conducting oxide is represented by the formula $A_x A'_{x'} A''_{x''} B_y B'_{y'} B''_{y''} O_{3-z}$, where A,A',A" are chosen from the group comprising Groups 1, 2 and 3 and the F block lanthanides; and B,B',B" are chosen from the D block transition metals according to the Periodic Table of the Elements adopted by the IUPAC wherein $0<x\leq 1$, $0\leq x'\leq 1$, $0\leq x''\leq 1$, $0<y\leq 1$, $0\leq y'\leq 1$, $0\leq y''\leq 1$, $1.1>x+x'+x''>0.9$, $1.1>y+y'+y''>0.9$ and z is a number which renders the mixed conducting oxide charge neutral.

12. The module of claim 11 wherein A, A' or A" of the enumerated formula is a Group 2 metal selected from the group consisting of calcium, strontium, barium and magnesium.

13. The module of claim 12 wherein the planar dense layer is formed from a mixed conducting oxide represented by the formula $La_x A'_{x'} Co_y Fe_{y'} Cu_{y''} O_{3-z}$ wherein $1.1>x+x'>0.9$, $1.1>y+y'+y''>0.9$, $0<y'\leq 0.4$ and $0<y''\leq 0.4$, A" is selected from strontium, barium or calcium, and z is a number which renders the mixed conducting oxide charge neutral.

14. The module of claim 13 wherein the planar dense mixed conducting oxide layer is formed from a mixed conducting oxide selected from the group consisting of $La_{0.2}Ba_{0.8}Co_{0.8}Fe_{0.2}O_{3-z}$, $Pr_{0.2}Ba_{0.8}Co_{0.8}Fe_{0.2}O_{3-z}$, $La_{0.2}Ba_{0.8}Co_{0.6}Cu_{0.2}Fe_{0.2}O_{3-z}$, $La_{0.2}Sr_{0.8}Co_{0.4}Fe_{0.4}Cu_{0.2}O_{3-z}$, $La_{0.4}Sr_{0.6}Co_{0.4}Fe_{0.4}Cu_{0.2}O_{3-z}$, $La_{0.3}Sr_{0.7}Co_{0.8}Fe_{0.1}Cu_{0.1}O_{3-z}$ and $SrCo_{0.4}Fe_{0.4}Cu_{0.2}O_{3-z}$.

15. The module of claim 10 wherein the planar channel-free porous support is formed from a material selected from the group consisting of alumina, ceria, silica, magnesia, titania, a high temperature oxygen compatible metal alloy, a metal oxide stabilized zirconia and mixtures thereof.

16. The module according to claim 10 wherein each membrane unit further comprises a catalyzed layer having through porosity which is contiguous to the planar dense mixed conducting oxide layer on a side opposite the channel-free porous support.

17. The module according to claim 3 wherein the channeled layer comprises a plurality of radial channels.

* * * * *